(12) United States Patent
Hallberg (10) Patent No.: US 7,438,814 B2
(45) Date of Patent: Oct. 21, 2008

(54) METHOD AND APPARATUS FOR THE PURIFICATION OF GROUND WATER

(75) Inventor: Rolf Hallberg, Tyresö (SE)

(73) Assignee: Tyresö Miljökemi, Tyreso (SE)

( * ) Notice: Subject to any disclaimer, the term of this patent is extended or adjusted under 35 U.S.C. 154(b) by 0 days.

(21) Appl. No.: 11/632,496

(22) PCT Filed: Aug. 6, 2004

(86) PCT No.: PCT/SE2004/001169

§ 371 (c)(1),
(2), (4) Date: Jan. 16, 2007

(87) PCT Pub. No.: WO2006/014126

PCT Pub. Date: Feb. 9, 2006

(65) Prior Publication Data

US 2007/0235387 A1    Oct. 11, 2007

(51) Int. Cl.
*C02F 3/00* (2006.01)
(52) U.S. Cl. .................. 210/610; 210/170.07; 210/760; 166/246
(58) Field of Classification Search ............ 210/170.01, 210/170.07, 610, 760; 166/246
See application file for complete search history.

(56) References Cited

U.S. PATENT DOCUMENTS

| | | | |
|---|---|---|---|
| 3,649,533 A | 3/1972 | Reijonen et al. | |
| 4,683,064 A | 7/1987 | Hallberg et al. | |
| 4,755,304 A | 7/1988 | Hallberg et al. | |
| 5,325,795 A * | 7/1994 | Nelson et al. | 110/236 |
| 2004/0126190 A1 * | 7/2004 | Stegemeier et al. | 405/128.6 |
| 2005/0189108 A1 * | 9/2005 | Davidson | 166/249 |

FOREIGN PATENT DOCUMENTS

EP    0 928 642    7/1999

\* cited by examiner

*Primary Examiner*—Chester T Barry
(74) *Attorney, Agent, or Firm*—Dickstein Shapiro LLP (57) ABSTRACT

The present invention relates to a method for decreasing the contents of metals, metalloids, nitrate and nitrite, respectively, in raw water flowing through a basin (1), whereby water containing either oxygen, oxygen-releasing substances, metabolic reactions of naturally occurring micro-organisms or containing denitrification organisms and/or substrates therefore is intermittently introduced to the basin (1) through a number of satellite wells (2) arranged around at least one extraction well (3) for purified water. Water containing oxygen and/or oxygen-releasing substances or metabolic reactions of naturally occurring micro-organisms or denitrification organisms and/or substrates therefore is homogeneously distributed vertically in said basin (1), whereby the water to be purified is fed into the basin by horizontally arranged feeding pipes (5) and that the extraction of purified water from said at least extraction well (3) is such that a substantially negative pressure is created around said at least one extraction well (3). The invention relates also to an apparatus for carrying out the method and to a satellite well to be used in the apparatus.

13 Claims, 6 Drawing Sheets

METHOD AND APPARATUS FOR THE PURIFICATION OF GROUND WATER

FIELD OF THE INVENTION

The present invention relates to a method for decreasing the contents of metals, metalloids, nitrate or nitrite in ground water, artificial ground water, that is infiltrated surface water, or surface water according to the preamble of claim 1. The present invention relates also to an apparatus according to claim 8 for carrying out the method.

BACKGROUND OF THE INVENTION

In the past, water requiring treatment and purification for removal of iron and manganese was treated in a water treatment plant by adding oxygen to the water. This caused precipitation of impurities, which were filtered out to leave purified water. Oxygen was typically added to the water in the form of pure oxygen, or by aeration of the water through the use of a cascade aerator. Because the concentration of oxygen necessary to precipitate metal ions from solution is comparatively low, metals iron and manganese were precipitated through the filtration process described above, wherein the filter encompassed one or more layers of sand through which the water was passed. Capital investment and operating costs for such a purification plant are high since the sand layers which function as the filter material must be regenerated from time to time to enhance the removal of the precipitated metal ions of manganese and iron.

Alternatively, ground water has been purified in situ as described in Swedish Patent Specification No. 6903544-2. Water containing oxygen or oxygen-releasing substances was introduced intermittently into an aquifer through a number of satellite wells or satellite pipes, arranged at a predetermined distance and surrounding a supply well or supply pipe. Oxygenated water introduced in this mantel into an aquifer creates a suitable environment for the growth of certain microbes enhancing chemical and metabolic adsorption, oxidation and precipitation of compounds in the existing ground layers, thereby utilizing the ground layers as a reaction and filtration medium. The microbes employed are often organisms being active primarily in zones created between oxidizing and reducing conditions. Water containing oxygen or oxygen-releasing substances was added intermittently over a period of approximately twenty-four (24) hours. During the addition of oxygenated water or water containing oxygen-releasing substances, the supply well could not be used as a purified water source since concurrent use of the supply well and the satellite wells would cause the failure of the filtration mechanism or a disturbance in its operation, resulting in a deterioration of the quality of water. To supply water on a continuous basis, two or more supply wells or a suitable means for storage has been required to circumvent the above-described disadvantages, enabling the withdrawal of purified water to be alternated between at least two supply wells or between the well and the storage means. Regeneration was performed on the dormant supply well or wells if necessary during withdrawal of purified water from the alternate supply source.

When water is withdrawn from a single supply well and conveyed to a satellite well or a plurality of satellite wells to allow concurrent use of the supply well, the flow pattern of recharged water becomes generally parallel to the flow pattern of the water to be purified. When this generally parallel flow pattern is established, a discontinuous radial purification pattern develops between the satellite wells and the supply well without being purified. This gradually reduces the operability of the supply well due to precipitation of iron and manganese, which occurs in greatest measure in a smaller portion of the aquifer within close proximity to the supply well. This problem does not occur when using two or more supply wells as previously described, and by alternating the withdrawal of purified water between the supply wells thereby distributing the precipitation over a greater portion of the aquifer.

To eliminate the drawback with a discontinuous supply of water another alternative of ground water purification in situ has been described in Swedish Patent Specification No. 8206393-4. An advantage of that invention is the elimination of the need for two or more supply wells, permitting purified water to be pumped continuously from a single supply means by creating a flow pattern between satellite wells which is approximately perpendicular to the flow pattern of the water to be purified. In this way, a circumferential purification pattern develops at a sufficient distance from the supply well which distributes the precipitation over a greater portion of the aquifer allowing the operability of the supply well to be maintained.

As used herein, the term "satellite wells" as used herein is used to indicate any means by which treated water may be introduced into a filter, basin, aquifer or similar purification or filtration system through which such water is to be purified. However, it is to be understood that "satellite wells" are also used to withdraw water for introduction into other satellite wells. Representative examples of satellite wells include wells, pipes, hoses, tubes and similar devices.

During the operation conditioned water is fed to at least one but less than all of the satellite wells, and simultaneously with such introduction, water is drawn from at least one satellite well for the purpose of creating a purification zone for the adsorption, transformation, oxidation, precipitation or volatilization of contaminants. In particular, water conditioned with oxidizing agents or other beneficial additives is utilized to reduce the concentration of impurities from untreated water, rendering the water "purified." Feeding conditioned water into the satellite wells in this manner creates a purification or filtration zone at a distance sufficiently far from the supply means so as to avoid clogging of the supply means, and maintain adequate flow to the supply means through a purification zone. The water fed to the satellite wells may consist of conditioned water drawn from at least one other satellite well and if desired also a portion of the purified water drawn from the supply means.

By changing the plurality of satellite wells into which conditioned water is introduced, and by alternating the satellite wells from which water is withdrawn, the user optimizes the purification zone in which contaminants are precipitated. Any number of satellite wells greater than two may be used in this system, depending upon the size of the purification system, hydrogeologic conditions, biogeochemical conditions, the concentration of impurities contained in the water, etc. Conditioned water may be introduced into the satellite wells for a predetermined period, ranging from a few hours to a few days or longer.

The process according to Swedish Patent Specification No. 8206393-4 also enables the continuous filtration and purification of ground water and surface water utilizing a basin, wherein a filter comprised of naturally occurring or man-made material is contained and utilized. For example, soil may be excavated to form a basin-shaped cavity with a mantle surface, and a sealing layer of clay, concrete, plastic, water-resistant cloth or the like may be applied to the mantle surface to form an inner wall. Satellite wells for the introduction of conditioned water, are placed inside the mantle within the basin, and the basin is filled with a filter material, such as sand. The supply means may be located in the centre of the basin; the satellite wells for introducing treated water are arranged between the mantle and the basin centre, around the interior of the periphery of the inner wall of the basin, so as to enable the introduction of conditioned water into the purification system through a plurality of the satellite wells, extraction of water through at least one satellite well and the continuous withdrawal of purified water through the supply means. In the man-made aquifer, water is intermittently drawn from at least one satellite well, is conditioned and is further introduced into at least one other satellite well. Alternating the satellite wells used for recharge with the satellite wells used for withdrawal of water in this manner effectively alternates the purification zones utilized for the precipitation of contaminants.

PCT WO 02/48469 describes means and methods for purification of water, where these also can be used in an artificial aquifer, e.g. a basin filled with inert material. In the description, the tightening cloth against the ambient soil is said to be arranged below the soil surface, which means that the top part is open against the atmosphere. The same arrangement is also true for the Swedish Patent Specification No. 8206393-4. This will give rise to an overflow and out wash of material from the basin because of the high water pressures that are built up in the basin from the infiltration of raw water and recharge into the satellite wells.

Figure 3:
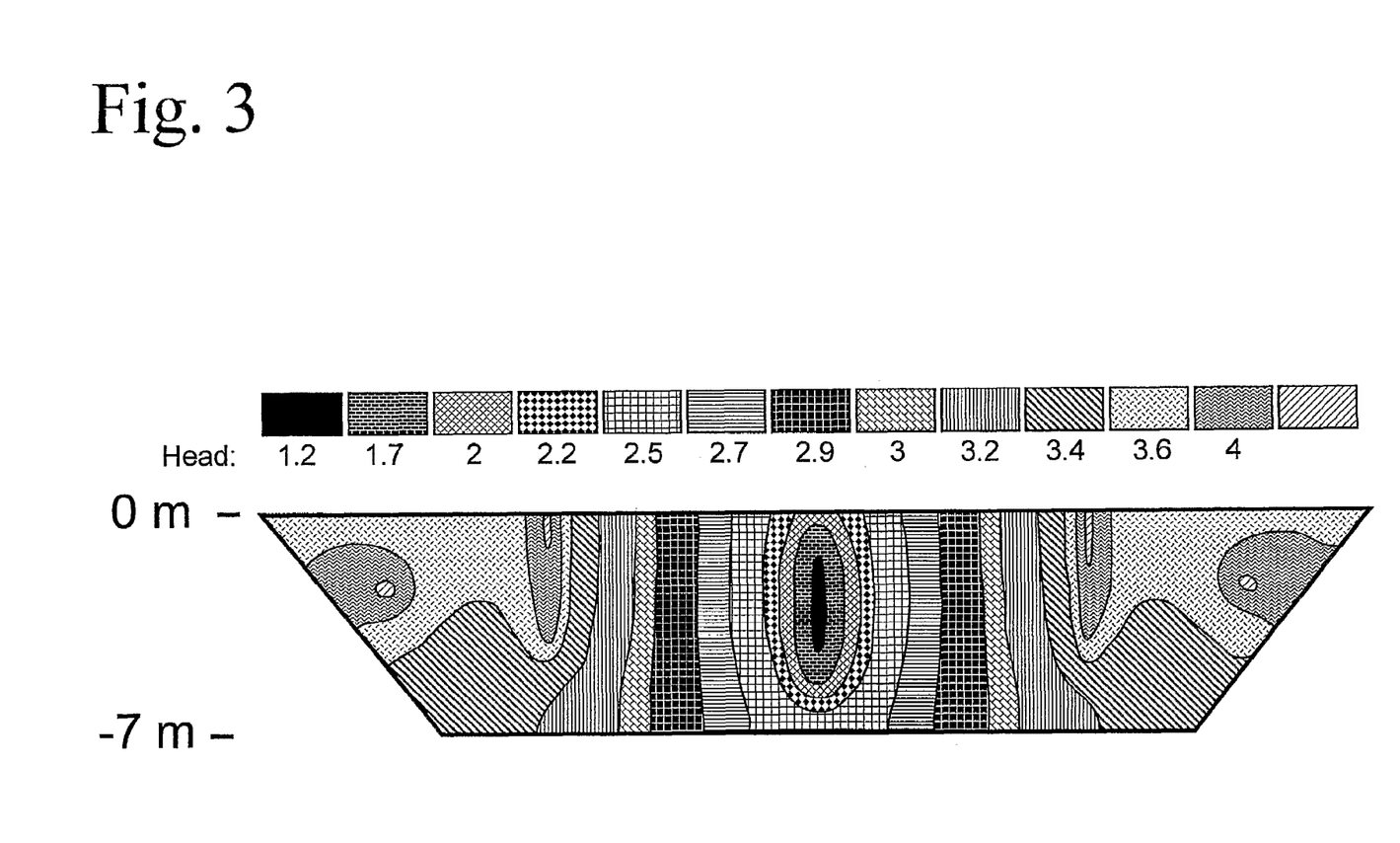
FIG. 3 is a computer simulation of distribution of pressure head in an apparatus for purification of raw water according to known technology.
Figure 4:
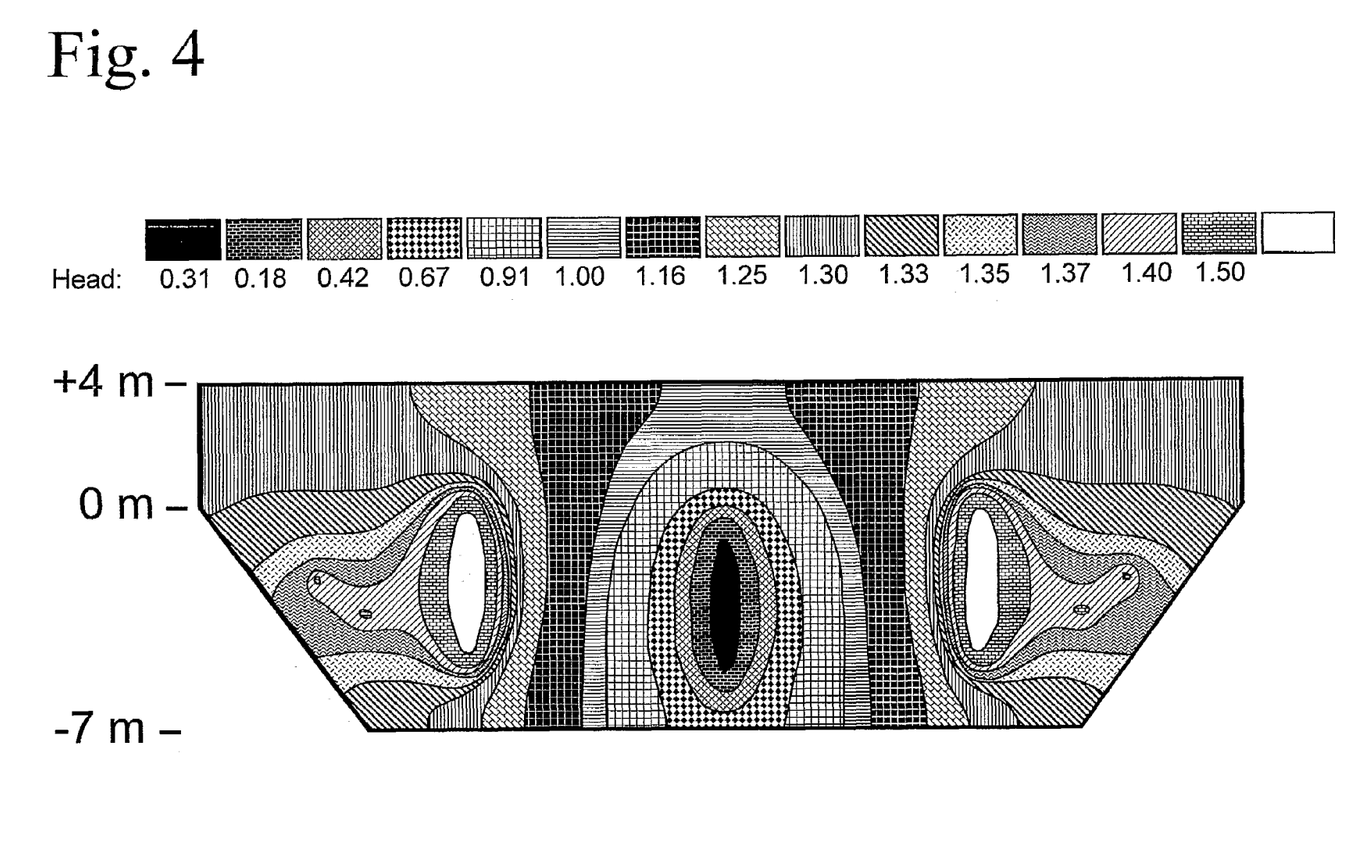
FIG. 4 is a computer simulation of the distribution of pressure head in a non-hermetically sealed apparatus for purification of raw water.

FIG. 3 shows a computer simulation of the problem with high water pressures which shows that a pressure equal to an overburden of more than four meters will be required to produce a sufficient counter pressure to counteract the high water pressure which prevail in known apparatuses. As can bee seen in FIG. 4, even with an overburden of four meters, an overpressure of about 1.3 meters still exists.

THE OBJECT OF THE INVENTION

The object of the invention is to eliminate the above-mentioned disadvantages and to permit purification of raw water in a continuous and cost-effective way.

Thus, the invention relates to a method for decreasing the contents of metals, metalloids, nitrate and nitrite, respectively, in ground water, artificial ground water, that is infiltrated surface water, or surface water flowing through a basin containing naturally occurring filter material, whereby in case of decreasing the contents of metals or metalloids water containing oxygen or oxygen-releasing substances and/or metabolic reactions of naturally occurring micro-organisms and in the case of decreasing the contents of nitrate and nitrite water containing denitrification organisms and/or substrates therefore is intermittently introduced to the basin through a number of injection wells arranged around at least one extraction well for purified water. The method is characterized in that said water containing oxygen or oxygen-releasing substances and/or metabolic reactions of naturally occurring micro-organisms or denitrification organisms and/or substrates therefore is homogeneously distributed vertically in said basin, that the water to be purified is fed into the basin by horizontally arranged feeding pipes and that the extraction of purified water from said at least one extraction well is such that a substantial negative pressure is created around said at least one extraction well.

According to a preferred embodiment of the method said negative pressure around said at least one extraction well is of the order of magnitude of about one metre water head.

According to another preferred embodiment of the method the extraction of purified water from the extraction well is such that the water pressure of both the feeding pipe and the injection pipes are reduced to more than half the pressure otherwise existing in the feeding pipe and the injection pipes.

The invention relates also to an apparatus for decreasing the contents of metals, metalloids, nitrate and nitrite, respectively, in ground water, artificial ground water, that is infiltrated surface water, or surface water flowing through a basin containing naturally occurring filter material, whereby in case of decreasing the contents of metals or metalloids water containing oxygen or oxygen-releasing substances and/or naturally occurring micro-organisms and in the case of decreasing the contents of nitrate and nitrite water containing denitrification organisms and/or substrates therefore is intermittently introduced to the basin through a number of injection wells arranged around at least one extraction well for purified water. This apparatus is characterized in that the basin is hermetically sealed by a material impermeable to air and water and that all inlets and outlets through the material are impermeable to air and water.

According to a preferred embodiment of the apparatus the satellite well comprises at least one injection pipe and at least one extraction pipe and said injection pipe and said extraction pipe are provided with apertures or holes in such a way that the areas of these apertures or holes compensate for the increased water pressure in the vertical direction.

BRIEF DESCRIPTION OF THE DRAWINGS

By way of a non-limiting example the invention will be described below with reference to the accompanying drawings, in which.

DESCRIPTION OF PREFERRED EMBODIMENT

Figure 1:
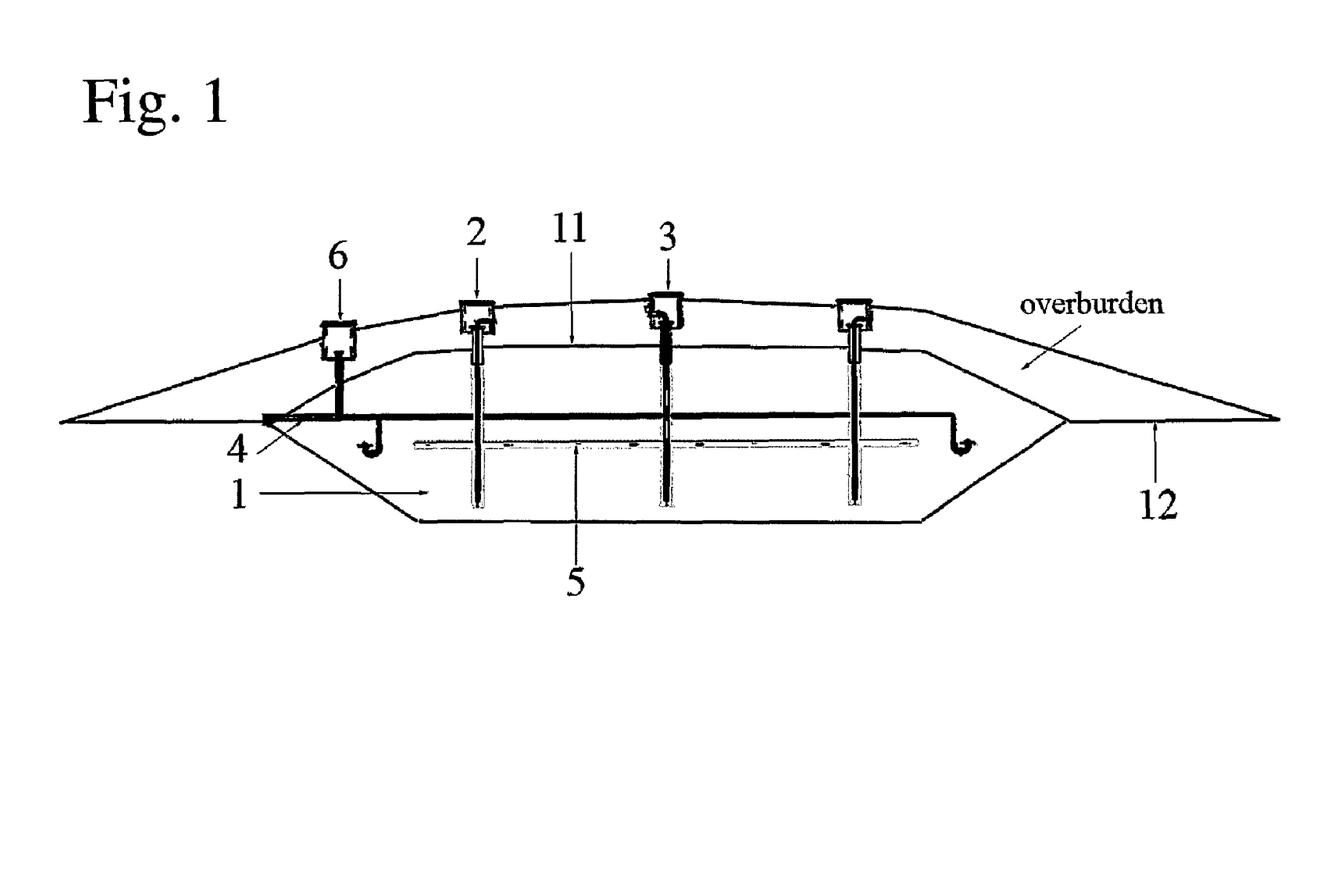
FIG. 1 is a schematic side view of an apparatus according to the invention for purification of raw water.

FIG. 1 shows an apparatus according to the invention in a preferred embodiment for decreasing the contents of metals, metalloids, nitrate and nitrite in raw water, comprising a basin or artificial aquifer 1 provided in a cavity in the ground and containing naturally occurring filter materials, such as sand, or other suitable materials, not shown, a plurality of injection/satellite wells 2, an extraction well 3, an raw water supply pipe 4 for supplying water from, for instance, a ground water well, not shown, for feeding horizontally arranged supply means or feeding pipes 5, and a well 6 for possible cleaning of said raw water supply pipe 4. The basin 1 is totally surrounded by a material 11 impermeable to air and water of, for instance, rubber and/or plastic material, i.e. a hermetically sealed basin 1. This is also true for the top part of the basin 1. Moreover, all inlets and outlets for pipers, cables and so forth provided through the material 11 are made impermeable to air and water. In said FIG. 1 the ground-level plan is denoted by 12.

In the embodiment shown the basin is covered by an overburden with a thickness of approximately one metre.

Figure 2:
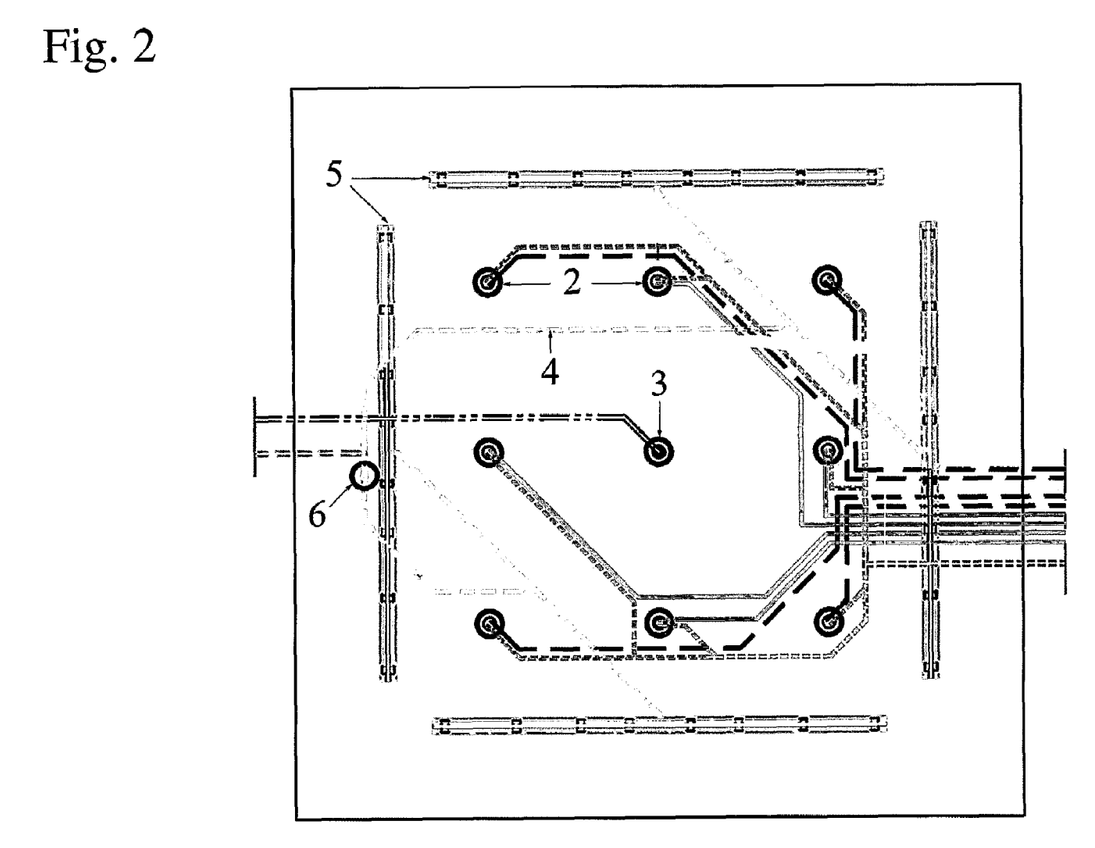
FIG. 2 is a schematic view from above of the apparatus according to the invention provided with a central extraction well and several satellite wells arranged around said extraction well and in which feeding pipes and pipes for infiltration of raw water is shown by broken lines and with the covering overburden removed.

As can be seen in FIG. 2 in a particular embodiment the apparatus has the form of a square basin 1, but it is obvious that the basin can have any other form such as round or rectangular.

In the shown embodiment eight satellite wells 2 and one extraction well 3 are arranged in the basin 1. The raw water supply pipe 4 shown by dotted lines is connected to at least one feeding pipe 5 arranged parallel to each side of the basin 1. Moreover, each of the satellite wells 2 are connected to means for oxygenating the water taken out of said wells 2 and after the water is oxygenated it is feed back preferably to the well 2 and is injected into the basin 1.

Figure 6:
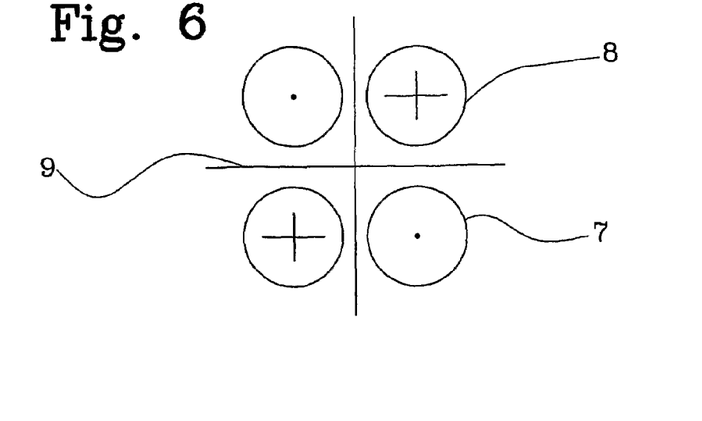
FIG. 6 is an end view of a satellite well used in the apparatus according to the invention and FIG. 7 is a partially sectioned side view of the satellite well in FIG. 6.
Figure 7:
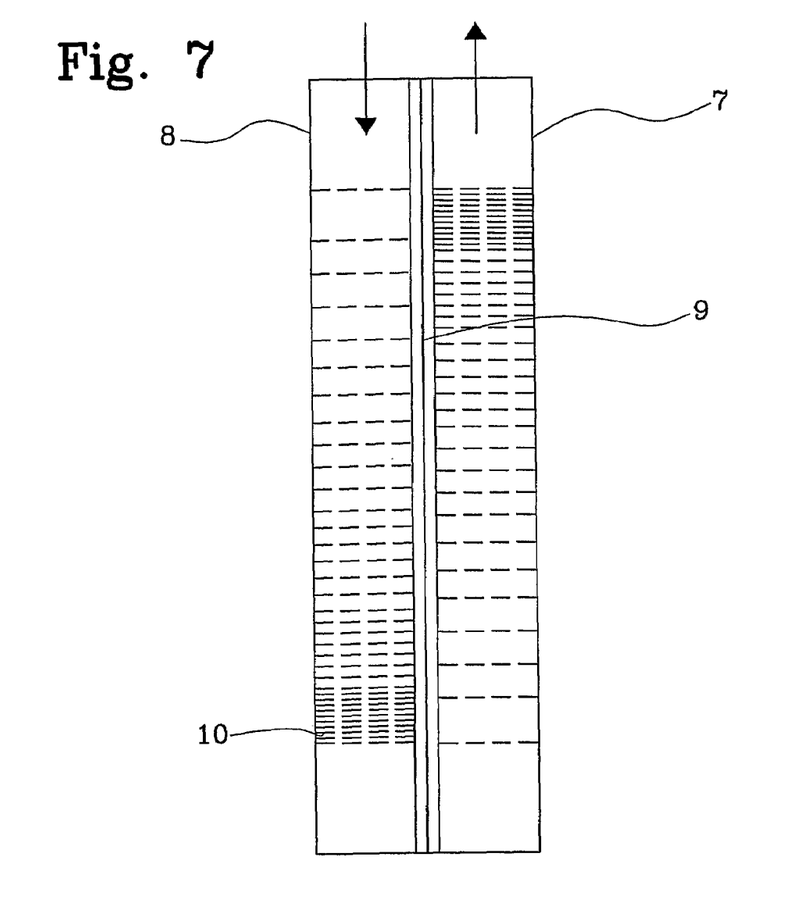

In the apparatus according to the invention the satellite wells 2 and the extraction well 3 are particularly arrange for uniform distribution of water in the vertical direction of the basin when the water is injected and/or pumped out from the basin 1. More exactly, in a preferred embodiment of the apparatus, as can be seen in FIG. 6 and 7, the satellite wells 2 are designed in such a way that they comprise at least one extraction pipe 7 and at least one injection pipe 8 (in the embodiment shown two injection pipes and two extraction pipes) separated by a separating means 9. The extraction pipes 7 and the injection pipes 8 are designed in such a way that the area of the openings in the form of perforations or apertures 10 or holes made in any other way in the pipe wall of the pipes 7, 8 against the surrounding material compensate for the increased water pressure in the vertical direction. The extraction pipes 7 are thus provided with area of the openings which in any horizontal portion has inverse proportion to the increased pressure head of the water in the vertical direction, so that flow of extracted water is uniformly distributed along the entire envelope surface of the pipes. Otherwise most of the water will come from the deeper parts of the well where the pressure of water is highest. In the same way the injection pipes 8 have an area of openings which in any horizontal portion has inverse proportion to the increased pressure head of the water in the vertical direction, whereby the water injected is uniformly distribute along the entire envelope surface of the pipe so as to avoid that most of the water otherwise will leave the injection pipes 8 at the upper part of the envelope surface of the pipes. The extraction and injection pipes 7, 8 can be made as separate pipes or can be separated by the separating means 9, as shown in FIG. 7.

Furthermore, it is obvious to the artisan that the design of the satellite well, i.e. the extraction pipe 7 and the injection pipe 8 shown in FIG. 7, can be used together with apparatuses used for purification of ground water, artificial ground water, that is infiltrated surface water, or surface water in situ.

Figure 5:
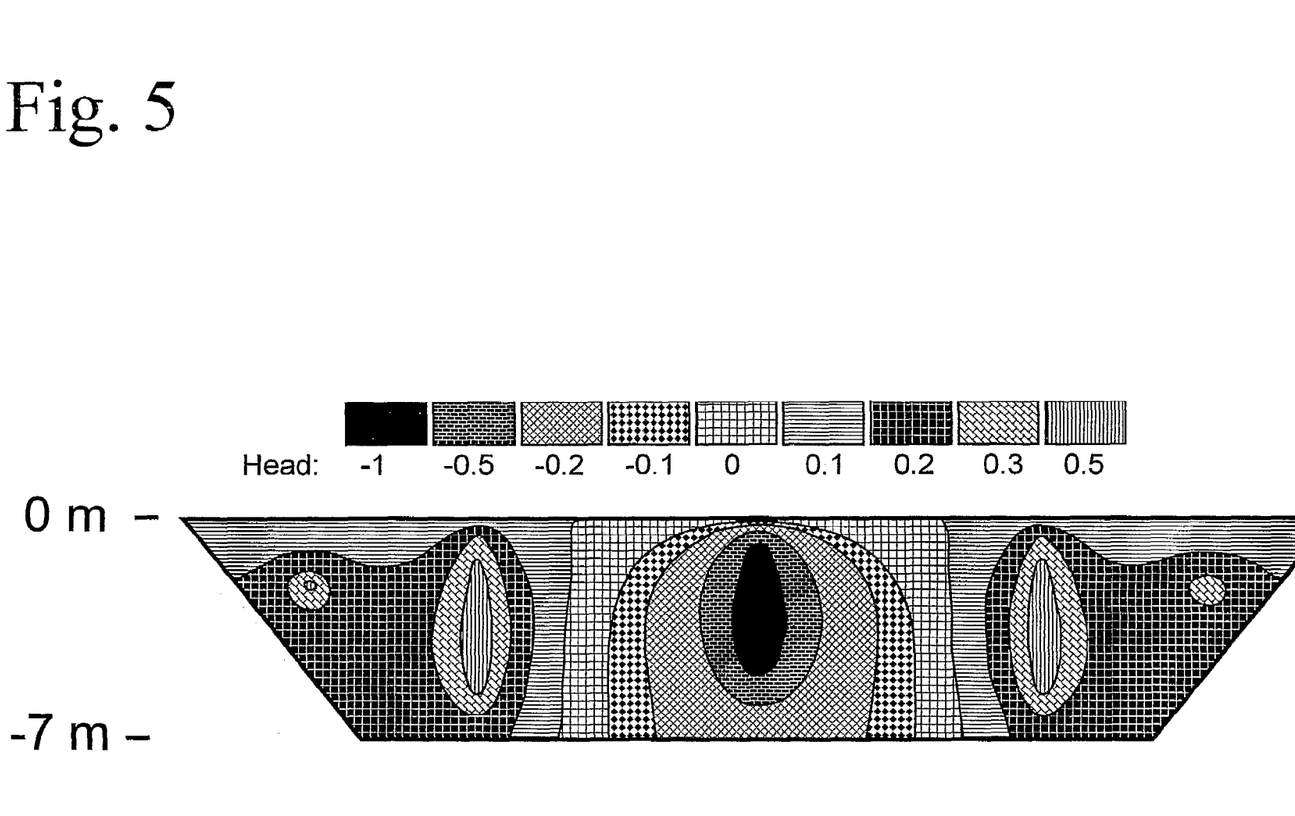
FIG. 5 is a computer simulation of the distribution of pressure head in a hermetically sealed apparatus for purification of raw water according to the invention.

When the method according to the invention is started the basin 1 filled with filter material is totally filled water. Then the pumping of water from the extraction well 3 is started and continues to the water level around said well 3 has been lowered about one metre from the starting level. Then water is feed through the raw water supply pipe 4 to the horizontally arranged feeding pipes 5 with a total volume corresponding to the volume taken out through the extraction well 3, whereby the distribution of the water pressure in the basin 1, as seen in FIG. 5, is obtained. Should no further measures be taken, then by the time the natural course will level out the lowering of the water level around the extraction well 3 and large water pressures would arise in the peripheral parts of the basin 1 which will result in overflow and out wash of the filter material as described above. To avoid this it is necessary to automatically control flowing in and flowing out of the water so that the lowering around the extraction well 3 is maintained.

According to the invention the high increased pressure in the horizontal feeding pipes 5 and the injection pipes 8 is controlled by pumping water out from the extraction well 3 in such a way that the pressure is reduced to about half of the pressure which would otherwise prevail in said pipes. This special method of pumping, requiring a control and adjust devise, not shown, is designed in such a way that it always prevail a high negative pressure around the central extraction well 3 which in a preferred embodiment corresponds to about one metre water head under the impermeable material at the ground-level plan of the basin 1, see FIG. 5.

Thus, according to the invention the overpressure under the impermeable material is compensated for by an overburden with a rather moderate thickness over the basin 1, since the water can not raise more that to the impermeable material. The pressures that will arise are shown in FIG. 5 and as seen they will be at most about 0,5 meters water head. By providing the basin 1 with an impermeable material 11 which extends around the whole basin, also the purified water is screened off from possible impurities in the surrounding soil and air.

In the case oxygen is added through aeration this is done in such a way that the water is allowed to circulate through an aeration system, not shown, outside the closed basin 1. This aeration system may be common to the injection and extraction pipes 8, 7 which are placed around the extraction well 3. The water from the extraction pipes 7 is aerated in a common devise, not shown, whereupon a certain deaeration is made in a small basin, not shown, so that free air bubbles may escape to the ambient air. The water from the small basin is the distributed uniformly by pumping through valves to the injection pipes 8.

Moreover, oxidizing agents include not only water-soluble chemicals and gases, but also micro-organisms and all other compositions, which may cause the oxidation of impurities or contaminants. When the invention is used to purify ground water or to purify raw water using the technology described herein, it is also possible to use the metabolic reactions of naturally occurring micro-organisms as the mechanism by which precipitation or degradation of contaminants occurs. For example, the micro-organisms Crenothrix, Leptothrix and Gallionella have been used to cause the oxidation and/or precipitation of the contaminants iron and manganese in the presence of oxygen. Similarly, by conditioning the water for recharge with different agents, such as methane or nutrients, heterotrophic micro-organisms may be induced to oxidize or otherwise metabolically degrade various organic compounds, which have contaminated the water. Hence, naturally occurring micro-organisms serve in part as one means by which contaminated water may be purified utilizing the invention.

The filter material in the basin 1 does not need to be changed or regenerated for removal of precipitated iron and manganese or other metals or metalloids, since the porosity of the filter material preferably is dimensioned for a life time of more than 100 years before clogging of the filter material will lead to a reduction in pumping capacity from the extraction well 3.

The basin 1 shown in FIG. 1 can be combined with one or more similar basin(s) whereby the injection and extraction pipes which then will be adjacent to each other are combined so as to form common injection and extraction pipes.

The invention has been described above for removal of iron and manganese, but it is obvious to the artisan that it also can be used for removal of other metals or metalloids such as lead and arsenic.

Since the basin/artificial aquifer 1 according to the invention forms a closed system it is also possible to use processes requiring the absence of oxygen. The injection pipes 8 may instead of injection of oxygenated water be used for injection of necessary nutrients for the micro-organisms living under anoxic conditions. Such nutrients may consist of phosphates and substances of low molecular weight such as alcohols. In such a process nitrate and nitrite are converted to nitrogen which is made by using denitrification organisms, and the nitrogen will follow the water taken out of the extraction well 3. This water has to be aerated to restore the equilibrium between nitrogen and oxygen to the content of the atmosphere.

In the case it is desirable to remove both metals, metalloids and nitrate and nitrite, respectively, from the raw water at the same time, this can be done in at least two steps, whereby nitrite and nitrate are removed first in a basin comprising one or several separately arranged modules by feeding nutrients but not oxygen to at least a first module(s) and then oxygen or oxygen-releasing substances to at least a second module. The water from the first module(s) may be feed to the second module(s) without any intermediate treatment. Of course the two step purification of the raw water can also be made in separately arranged basins 1.

The invention claimed is:

1. A method for purifying raw water by decreasing the contents of at least one contaminant selected from the group consisting of metals, metalloids, nitrate, and nitrite in said raw water, the method comprising:
   feeding raw water containing at least one contaminate selected from the group consisting of metals, metalloids, nitrate, and nitrite through horizontally arranged feeding pipes into a basin;
   flowing said raw water through naturally occurring filter material arranged in said basin;
   intermittently introducing water containing at least one agent selected from the group consisting of oxygen, oxygen-releasing substances, metabolic substrates, and naturally occurring micro-organisms to the basin through a plurality of satellite wells arranged around at least one extraction well for extracting purified water, wherein said water containing at least one agent selected from the group consisting of oxygen, oxygen-releasing substances, metabolic substrates, and naturally occurring micro-organisms is homogeneously distributed vertically in said basin;
   creating a constant negative pressure around said at least one extraction well; and
   extracting said purified water from said at least one extraction well.

2. The method according to claim 1, wherein said negative pressure around said at least one extraction well is of an order of magnitude of about one meter water head.

3. The method according to claim 1, wherein said basin is divided into at least two separately arranged modules, wherein the contents of nitrate and nitrite are decreased in a first module in a first step, and the contents of metals and metalloids are decreased in a second module in a second step, and wherein the water is fed between the first module and the second module without any intermediate treatment between said first step and said second step.

4. The method according to claim 1, wherein the metals and metalloids to be removed from the raw water are selected from the group consisting of iron, manganese, lead, and arsenic.

5. The method according to claim 1, wherein said at least one contaminate is selected from the group consisting of nitrate and nitrite.

6. The method according to claim 1, wherein said at least one contaminate is selected from the group consisting of metals and metalloids.

7. An apparatus for purifying raw water by decreasing the contents of at least one contaminant selected from the group consisting of metals, metalloids, nitrate, and nitrite in said raw water, the apparatus comprising:
   a basin for containing naturally occurring filter material, and through which said raw water may be flowed;
   at least one extraction well for extracting purified water from said basin; and
   a plurality of satellite wells arranged around said at least one extraction well, said plurality of satellite wells adapted for intermittently introducing water containing at least one agent selected from the group consisting of oxygen, oxygen-releasing substances, metabolic substrates, and naturally occurring micro-organisms,
   wherein the basin is hermetically sealed by a material that is impermeable to air and water, and
   wherein all sealing joints around inlets and outlets through the material are impermeable to air and water.

8. The apparatus according to claim 7, wherein said plurality of satellite wells comprise at least one injection pipe and at least one extraction pipe, said at least one injection pipe and said at least one extraction pipe being provided with apertures or holes in such a way that the areas of these apertures or holes compensate for increased water pressure in the vertical direction.

9. The apparatus according to claim 7, wherein the basin comprises at least two separately arranged modules arranged so that water may be fed between the modules without any intermediate treatment.

10. The apparatus according to claim 7, wherein the metals and metalloids to be removed from the raw water are selected from the group consisting of iron, manganese, lead and arsenic.

11. A satellite well adapted to be used in the apparatus according to claim 7 or in a known apparatus for purification of raw water, comprising:
   at least one injection pipe comprising a plurality of apertures or holes having areas that increase with the depth of said at least one injection pipe; and
   at least one extraction pipe comprising a plurality of apertures or holes having areas that decrease with the depth of said at least one injection pipe.

12. The method according to claim 1, characterized in that said raw water comprises water selected from the group consisting of ground water, infiltrated surface water, and surface water.

13. The apparatus according to claim 7, characterized in that said raw water comprises water selected from the group consisting of ground water, infiltrated surface water, and surface water.

* * * * *